US010203138B2

(12) United States Patent
Appler et al.

(10) Patent No.: US 10,203,138 B2
(45) Date of Patent: Feb. 12, 2019

(54) NEUTRALIZATION AND REMOVAL OF ACIDS IN HVAC SYSTEMS THROUGH THE USE OF DRYING AGENTS

(71) Applicant: CLIPLIGHT HOLDINGS, LTD., Toronto (CA)

(72) Inventors: Paul Clarence Appler, Windsor (CA); Jesse Homenuik, North York (CA); Norma Hill, North York (CA); George E. Cranton, North York (CA)

(73) Assignee: Alltemp Products Company Limited, Pickering, Ontario (CA)

( * ) Notice: Subject to any disclaimer, the term of this patent is extended or adjusted under 35 U.S.C. 154(b) by 0 days.

(21) Appl. No.: 14/782,199

(22) PCT Filed: Apr. 2, 2014

(86) PCT No.: PCT/CA2014/050331
§ 371 (c)(1),
(2) Date: Oct. 2, 2015

(87) PCT Pub. No.: WO2014/161088
PCT Pub. Date: Oct. 9, 2014

(65) Prior Publication Data
US 2016/0040918 A1    Feb. 11, 2016

Related U.S. Application Data

(60) Provisional application No. 61/807,474, filed on Apr. 2, 2013.

(51) Int. Cl.
C09K 15/06      (2006.01)
F25B 45/00      (2006.01)
C09K 5/04       (2006.01)
C23F 11/04      (2006.01)
C10M 171/00     (2006.01)
B65D 1/12       (2006.01)
C10M 141/02     (2006.01)
C23F 11/12      (2006.01)
C23F 11/18      (2006.01)
F25B 47/00      (2006.01)

(52) U.S. Cl.
CPC ............. *F25B 45/00* (2013.01); *B65D 1/12* (2013.01); *C09K 5/041* (2013.01); *C09K 15/06* (2013.01); *C10M 141/02* (2013.01); *C10M 171/008* (2013.01); *C23F 11/04* (2013.01); *C23F 11/12* (2013.01); *C23F 11/18* (2013.01); *F25B 47/00* (2013.01); *C10M 2201/062* (2013.01); *C10M 2203/065* (2013.01); *C10M 2203/1006* (2013.01); *C10M 2205/0285* (2013.01); *C10M 2207/026* (2013.01); *C10M 2207/04* (2013.01); *C10M 2207/042* (2013.01); *C10M 2207/127* (2013.01); *C10M 2207/2835* (2013.01); *C10M 2209/1033* (2013.01); *C10M 2215/042* (2013.01); *C10M 2215/064* (2013.01); *C10M 2215/14* (2013.01); *C10M 2215/223* (2013.01); *C10M 2219/046* (2013.01); *C10M 2223/04* (2013.01)

(58) Field of Classification Search
CPC ........ C09K 5/041; C09K 15/06; C09K 15/00; C09K 15/16; C09K 15/18; C09K 15/12; C09K 5/08; C10M 141/02; C10M 171/008; C10M 2223/04; C10M 2201/062; C10M 2203/065; C10M 2203/1006; C10M 2205/0285; C10M 2207/026; C10M 2207/04; C23F 11/12; C23F 11/18; C23F 11/04; B65D 1/12; F25B 45/00; F25B 47/00
USPC ........... 252/69, 68, 67, 389.62; 62/292, 475; 137/15.05; 206/524.6; 422/7; 508/579
See application file for complete search history.

(56) References Cited

U.S. PATENT DOCUMENTS

| 3,346,496 | A |   | 10/1967 | Neumann et al. |           |
|-----------|---|---|---------|----------------|-----------|
| 5,254,280 | A | * | 10/1993 | Thomas         | C10M 107/38 |
|           |   |   |         |                | 252/67    |
| 5,395,544 | A | * | 3/1995  | Hagihara       | C09K 5/045 |
|           |   |   |         |                | 252/68    |
| 5,503,757 | A |   | 4/1996  | Ignatow et al. |           |
| 5,720,895 | A | * | 2/1998  | Nakagawa       | C07C 43/10 |
|           |   |   |         |                | 252/67    |
| 5,869,702 | A | * | 2/1999  | Nakagawa       | C07C 43/10 |
|           |   |   |         |                | 549/364   |
| 5,922,239 | A | * | 7/1999  | Nakagawa       | C07C 43/10 |
|           |   |   |         |                | 252/67    |

(Continued)

FOREIGN PATENT DOCUMENTS

WO      2010/028493 A1   3/2010
WO   WO2010028493 A1    3/2010

OTHER PUBLICATIONS

Robert Scaringe, "Flushing Techniques for R-22 to R-410A Conversions", Dec. 1, 2007.*

(Continued)

*Primary Examiner* — Douglas J McGinty
(74) *Attorney, Agent, or Firm* — Dentons US LLP; Brian R. McGinley; Heather M. Khassian

(57) ABSTRACT

A composition for neutralizing or removing an acid in a refrigeration or air-conditioning system, the composition comprising a) an acid neutralizer or scavenger such as a metal alkoxide, carbodiimide, glycidyl ether, epoxide, alkanolamine, arylamine, overbased metal sulphonates, or an inorganic base (e.g. KOH); and b) a hydrolytic drying agent such as an orthoester (e.g. triethylorthoformate), acetal, epoxide, or a carbodiimide, whereby the water formed by neutralization is removed from the system. Also disclosed is the use of the composition for neutralizing or removing an acid from a refrigeration or air-conditioning system; and a method for neutralizing or removing an acid from the refrigeration or air-conditioning system.

19 Claims, No Drawings

(56) References Cited

U.S. PATENT DOCUMENTS

| | | |
|---|---|---|
| 6,235,687 B1 | 5/2001 | Nadasdi et al. |
| 9,435,574 B2 * | 9/2016 | Appler ............... B60H 1/00585 |
| 2005/0034868 A1 | 2/2005 | Frost et al. |
| 2011/0167841 A1 * | 7/2011 | Appler ............... B60H 1/00585 |
| | | 62/77 |
| 2012/0145199 A1 | 6/2012 | Jernigan |

OTHER PUBLICATIONS

European Patent Office, Supplementary European Search Report, dated Nov. 17, 2016, 6 pages, published in Munich, Germany.

\* cited by examiner

NEUTRALIZATION AND REMOVAL OF ACIDS IN HVAC SYSTEMS THROUGH THE USE OF DRYING AGENTS

CROSS-REFERENCE TO RELATED APPLICATION

This application claims the benefit of and priority to US Provisional patent application Ser. No. 61/807,474, filed Apr. 2, 2013, under the title IMPROVED NEUTRALIZATION AND REMOVAL OF ACIDS IN HVAC SYSTEMS THROUGH THE USE OF DRYING AGENTS. The content of the above patent application is hereby expressly incorporated herein by reference into the detailed description hereof.

FIELD

The specification relates to a composition, use of the composition and a method for neutralizing or removal of acid in refrigeration or air-conditioning system.

BACKGROUND

Air conditioning and refrigeration systems of all shapes and sizes are in common use throughout industry, commercial establishments, public buildings and residences. Such refrigerant compressor systems can be generally characterized as systems which circulate a compressor fluid containing lubricating oil and a refrigerant type of gas that is compressible into a liquid and which is then expanded for absorption of heat. Common refrigerants used at this time can be classified as CFC (chlorofluorocarbons), HCFC (hydrochlorofluorocarbons), HFC (hydrofluorocarbons), and HFO (hydrofluoroolefins). Under the CFC classification are R-11, R-12, R-13, R-13B1, R-114, R-500, R-502 and R-503. The HCFC classification includes R-22, R-123, R-124, R-401A, R-402A, R-402B, R-403B, R-408A, R-409A and R-414B. The HFC classification includes R-23, R-134a, R-404A, R407A, R-407C, R-R-410A, R-422B, R-422C, R-422D, R-507 and R-508B. The HFO classification includes HFO-1234yf. The lubricating oil can be mineral oil (highly refined naphthenic), polyol ester, alkyl benzene, polyalkylene glycol or polyalphaolefin. The particular oil is selected based on compatibility with the specific refrigerant utilized in the air-conditioning or refrigeration unit.

A major problem with air-conditioning or refrigeration systems is recurring compressor burnout. The term compressor burnout is used to describe a disabling electrical failure in the compressor's electric motor or related electrical components within the system. Burnout can occur from a variety of causes, including direct damage to the electrical coils of the motor or other electrical system components, or from strain on the motor arising from operating at too high a temperature, at the wrong pressure and/or with an incorrect electrical power supply. While several factors may be the cause of compressor burnout, one of the most common causes is the formation of acid in the compressor fluid.

The amount of acid in the lubricating oil is typically denoted by the total acid number (TAN). The total acid number (TAN) is a measurement of acidity that is determined by the amount of potassium hydroxide in milligrams that is needed to neutralize the acids in one gram of oil. It is an important quality measurement of a lubricating oil while in service. The TAN value can not only signify potential for burn-out but also help indicate the potential of corrosion problems.

Acids are generally formed in the compressor fluid by the presence of contaminants and moisture, or the breakdown of refrigerant, oil and/or degradation of system parts, neither of which processes can be completely avoided. The contaminants and moisture, along with system operating conditions tend to partially break down the chlorofluorocarbons comprising the compressor fluid, releasing free halogen ions. These ions then combine with moisture to form acids which subsequently attack internal system parts. A major factor in this acid attack is that the internal structure of the air-conditioning or refrigeration system generally comprises various different materials that are susceptible to acidic attack, including steel, copper and copper alloys, aluminum, various synthetic seals, terminals and insulators. Once acids have formed in the air-conditioning or refrigeration system, they can cause corrosion and deterioration of various system parts, forcing the compressor motor to work harder, causing direct damage to the compressor motor itself, or causing leaks to form which allow moisture to enter the system promoting further acid formation. Regardless of its source, the presence of acid can eventually result in compressor burnout.

Since corrosion is a result of acid attack, acid neutralizers also may be added to the lubricating oil. These are usually but not necessarily organic compounds. Such organic compounds may be, for example, carbodiimides, glycidyl ethers and epoxides, alkanolamines or arylamines (U.S. Pat. No. 6,235,687, incorporated herein by reference). A number of different compounds can be included in these particular classes of compounds (see for instance U.S. Pat. No. 3,346,496; U.S. Pat. No. 3,723,320, incorporated herein by reference). Another possible acid neutralizer is potassium hydroxide (KOH), added as an alcoholic solution (U.S. Pat. No. 5,503,757, incorporated herein by reference).

The neutralizing action of the KOH and other options can result in the formation of water. As discussed above, water can degrade the performance of air-conditioning or refrigeration systems in several ways, including increasing the rate of organic acid formation through hydrolytic reactions with synthetic oils. The use of hydrolytic drying agents such as orthoformates to completely remove water in HVAC systems has been suggested (WO2010028493, incorporated herein by reference).

When acid neutralizing agents such as alcoholates, carbodiimides, glycidyl ethers, epoxides, alkanolamines or arylamines react in refrigeration systems, the reactions occur in a non-aqueous medium. As a consequence, the reactions are not easily driven to completion but are said to be equilibrium controlled reactions. This can result in re-formation of the acid for a transient period of time and can result in the detrimental impacts discussed above.

There is a need in the art for a composition that can drive such equilibrium controlled reactions to completion through the removal of reaction products; and thus can help to ensure that acid is not re-formed. Moreover, there is a need in the art for a composition that can be used as an additive for neutralizing or removal of an acid in a refrigeration or air-conditioning system.

SUMMARY OF INVENTION

In one aspect, the specification relates to a composition for neutralizing or removal of an acid in a refrigeration or air-conditioning system, the composition containing an acid neutralizer or scavenger and a hydrolytic drying agent.

In another aspect, the specification relates to use of the composition as disclosed herein for neutralizing or removal of an acid in refrigeration or air-conditioning system.

In a further aspect, the specification relates to a method of neutralizing or removal of an acid in refrigeration or air-conditioning system, the method containing the step of placing in the refrigeration or air conditioning system the composition as disclosed herein.

In another further aspect, the specification relates to a can containing the composition as disclosed herein.

In still another aspect, the specification relates to a kit containing the can having the composition as disclosed herein, along with instructions for use.

DESCRIPTION OF EXAMPLE EMBODIMENTS

As noted above, in one aspect, the specification relates to a composition for neutralizing or removal of an acid in refrigeration or air-conditioning system, the composition containing an acid neutralizer or scavenger and a hydrolytic drying agent.

The acid neutralizer or scavenger present in the composition is not particularly limited and is able to react with a protic acid to neutralize the acid. In one embodiment, the acid neutralizer or scavenger is a metal alkoxide, carbodiimide, glycidyl ether, epoxide, alkanolamine, arylamine, overbased metal sulphonates, overbased metal phenates, overbased metal salicylates or an inorganic base. The terms metal alkoxide, carbodiimide, glycidyl ether, epoxide, alkanolamine, arylamine, overbased metal sulphonates, overbased metal phenates, overbased metal salicylates and inorganic base are not particularly limited and should be known to a skilled worker.

The term metal alkoxide is not particularly limited and should be known to a skilled worker. As used herein, metal alkoxide refers to a compound of formula $M^+ \ ^-OR$, where $M^+$ is a metal, such as, for example and without limitation, $Na^+$, $K^+$, $Li^+$, $Mg^{+2}$ or $Ca^{+2}$, and R is a hydrocarbon.

The term carbodiimide is not particularly limited and should be known to a skilled worker. As used herein, carbodiimide refers to a compound having the formula $RN=C=NR$, where R is a hydrocarbon. Non-limiting examples of carbodiimides include, dicyclohexylcarbodiimide (($C_6H_{11})_2N=C=N(C_6H_{11})_2$) (DCC), 1-ethyl-3-(3-dimethylaminopropyl)carbodiimide (EDC) or N,N'-diisopropylcarbodiimide (DIC).

The term glycidyl ether is not particularly limited and should be known to a skilled worker. As used herein, glycidyl ether refers to a compound having the formula shown below, where R is a hydrocarbon. Examples of glycidyl ether can include, for example and without limitation, allyl glycidyl ether, phenyl glycidyl ether or ethyl glycidyl ether.

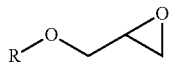

The term epoxide is not particularly limited and should be known to a skilled worker. As used herein, epoxide refers to a compound of formula shown below, where each R is independently a hydrogen or a hydrocarbon.

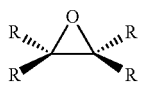

Epoxide compounds can be selected from among phenylglycidyl ether-type epoxy compounds, alkylglycidyl ether-type epoxy compounds, glycidyl ester-type epoxy compounds, allyloxirane compounds, alkyloxirane compounds, alicyclic epoxy compounds, epoxidized fatty acid monoesters and epoxidized vegetable oils. Specific, nonlimiting examples of phenylglycidyl ether-type epoxy compounds include phenyl glycidyl ethers and alkylphenyl glycidyl ethers. The alkylphenyl glycidyl ethers may have one to three $C_1$-$C_{13}$ alkyl groups, preferred examples of which include those with one $C_4$-$C_{10}$ alkyl group such as n-butylphenyl glycidyl ether, iso-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether and decylphenyl glycidyl ether. Specific, nonlimiting examples of alkyl glycidyl ether-type epoxy compounds include decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropanetriglycidyl ether, pentaerythritoltetraglycidyl ether, 1,6-hexanediol diglycidyl ether, sorbitolpolyglycidyl ether, polyalkyleneglycol monoglycidyl ether and polyalkyleneglycol diglycidyl ether. Specific, nonlimiting examples of glycidyl ester-type epoxy compounds include phenylglycidyl esters, alkylglycidyl esters and alkenylglycidyl esters such as glycidyl-2,2-dimethyl octanoate, glycidyl benzoate, glycidyl acrylate and glycidyl methacrylate. Specific, nonlimiting examples of allyloxirane compounds include 1,2-epoxystyrene and alkyl-1,2-epoxystyrenes. Specific, nonlimiting examples of alkyloxirane compounds include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane and 1,2-epoxyeicosane. Specific, nonlimiting examples of alicyclic epoxy compounds include 1,2-epoxycyclohexane, 1,2-epoxycyclopentane, 3,4-epoxycyclohexylmethyl-3,4-epoxycyclohexane carboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1-.0]heptane, 4-(1'-methylepoxyethyl)-1,2-epoxy-2-methylcyclohexane and 4-epoxyethyl-1,2-epoxycyclohexane. Specific, nonlimiting examples of epoxidized fatty acid monoesters include epoxidated esters of $C_{12}$-$C_{20}$ fatty acids and $C_1$-$C_8$ alcohols or phenols or alkylphenols such as butyl, hexyl, benzyl, cyclohexyl, methoxyethyl, octyl, phenyl and butylphenyl esters of epoxystearic acid. Specific, nonlimiting examples of epoxidized vegetable oils include epoxy compounds of vegetable oils such as soybean oil, linseed oil and cottonseed oil.

The term alkanolamine is not particularly limited and should be known to a skilled worker. As used herein, alkanolamine refers to a compound having both a hydroxyl (—OH) and an amine (—$NH_2$) functional groups on an alkane backbone. Examples of alkanolamine can include, for example and without limitation, ethanolamine, heptaminol, isoetarine, and methanolamine.

The term arylamine is not particularly limited and should be known to a skilled worker. As used herein, arylamine refers to a compound having an amine (—$NH_2$) functional group attached to aryl group, and can include, for example and without limitation, aniline or methyl aniline.

The terms overbased metal sulphonates, phenates or salicylates are not particularly limited and should be known to a skilled worker. As used herein, for example, overbased metal sulphonates refers to compounds that are preferably formed from a mixture of a sulphonic acid, a hydrocarbon solvent, an alcohol, water and a stoichiometric excess of a metallic base (preferably calcium hydroxide) above that required to react with the sulphonic acid. The mixture is overbased (carbonated) with an overbasing agent which provides a source of base. A typical overbased calcium sulphonate would have a chemical formula

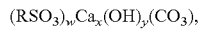

where R is an alkyl substituted phenyl group and w, x, y and z are molar quantities. Similar compositions can be produced with other metallic bases other than calcium hydroxide as well as for overbased metal phenates or overbased metal salicylates.

The term "hydrocarbon", as used herein, refers to a group that contains hydrogen and carbon, linked generally via a carbon backbone, but may optionally include heteroatoms. Thus, groups like methyl, ethoxyethyl, 2-pyridyl, and trifluoromethyl are considered to be hydrocarbyl for the purposes of this specification. Hydrocarbyl groups include, but are not limited to aryl, heteroaryl, carbocycle, heterocycle, alkyl, alkenyl, alkynyl, and combinations thereof.

The term "aryl" as used herein is not particularly limited, and should be known to a person of skill in the art. In one embodiment, for example and without limitation, the aryl group is a $C_{6-14}$ aryl. In another embodiment, for example and without limitation, aryl includes 5-, 6-, and 7-membered substituted or unsubstituted single-ring aromatic groups in which each atom of the ring is carbon. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Examples of aryl include, for example and without limitation, benzene, toluene, naphthalene, phenanthrene, phenol, aniline, anthracene, and phenanthrene.

The term "alkyl" as used herein is not particularly limited and should be known to a person of skill in the art; and refers to substituted or unsubstituted saturated hydrocarbon groups, including straight-chain alkyl and branched-chain alkyl groups, including haloalkyl groups such as trifluoromethyl and 2,2,2-trifluoroethyl, etc. In one embodiment, for example and without limitation, the alkyl group is a $C_{1-6}$ alkyl.

The term $C_{1-6}$ alkyl in accordance with the specification is not particularly limited and should be known to a person of skill in the art. The $C_{1-6}$ alkyl may be, for example, and without limitation, any straight or branched alkyl, for example, methyl, ethyl, n-propyl, i-propyl, n-butyl, butyl, sec-butyl, t-butyl, n-pentyl, i-pentyl, sec-pentyl, t-pentyl, n-hexyl, i-hexyl, 1,2-dimethylpropyl, 2-methylbutyl, 1,2-dimethylbutyl, 1-ethyl-2-methylpropyl, 1,1,2-trimethylpropyl, 1,1-dimethylbutyl, 2,2-dimethylbutyl, 2-ethylbutyl, 1,3-dimethylbutyl, 2-methylpentyl or 3-methylpentyl.

In one embodiment in accordance with the specification, the acid neutralizer or scavenger is a compound that can function as a strong base and drive the reaction to completion. Accordingly, in a further embodiment, the acid neutralizer or scavenger is an inorganic base. A base as used herein is not particularly limited and should be known to a skilled worker. As used herein, the inorganic base is a substance that can accept hydrogen cations (protons) or more generally, donate a pair of valence electrons. Examples of inorganic bases can include, without limitation, sodium hydroxide (NaOH), potassium hydroxide (KOH) or lithium hydroxide (LiOH).

The hydrolytic drying agent in accordance with the specification is not particularly limited and is able to react with any water, including water generated from reaction of the acid neutralizer or scavenger with the acid. In one embodiment, the hydrolytic drying agent is an orthoester, acetal, epoxide or carbodiimide.

The terms orthoester, acetal, epoxide and carbodiimide are not particularly limited and should be known to a skilled worker. As used herein, the term orthoester refers to a functional group containing three alkoxy groups attached to one carbon atom, i.e. with the general formula $RC(OR')_3$, where each R and R' independently is a hydrocarbon as described herein. As used herein, the term acetal refers to a functional group having the formula $RC(H)(OR')_2$, where each R and R' independently is a hydrocarbon, as described herein. In addition, the acetal can be replaced with a ketal. The term ketal should be known to a skilled worker and refer to a functional group having the formula $R_2C(OR')_2$, where each R and R' independently is a hydrocarbon. Examples of acetal can include, for example and without limitation, dimethoxymethane, dioxolane, metaldehyde and 1,3,5-trioxane.

In a particular embodiment in accordance with the specification, the hydrolytic drying agent is an orthoester. In a further embodiment, the orthoester is trialkylorthoformates, such as, for example and without limitation, trimethylorthoformate or triethylorthoformate (TEOF). A still further embodiment in accordance with the specification is triethylorthoformate.

In a particular embodiment, the composition contains an inorganic base in combination with an orthoester. In a still further particular embodiment, the inorganic base is a strong base, for example and without limitation, potassium hydroxide (KOH) and the orthoester is triethylorthoformate. Presence of the strong base, such as KOH, drives reaction with an acid to form water, which can react with an orthoester. Combination of the strong base and orthoester can help ensure removal of water and can help prevent corrosion. Moreover, the combination of the inorganic base and orthoester can prevent reversal of the reaction and generation of acid or water.

The amount of acid neutralizer or scavenger and hydrolytic drying agent in the lubricating oil is not particularly limited and can depend upon the particular application requirements. In one embodiment, for example and without limitation, the combination of the acid neutralizer or scavenger and hydrolytic drying agent are present from 0.1 to 20 wt % and all values in between, of the total lubricating oil composition. In a further embodiment, for example and without limitation, the combination of the acid neutralizer or scavenger and hydrolytic drying agent are present from 0.5 to 15 wt %, 1 to 12 wt % or 3 to 10 wt %, and all values in between and their combination, of the total lubricating oil composition.

The mole ratio of the acid neutralizer or scavenger and hydrolytic drying agent is not particularly limited and can depend upon the particular application requirements. The mole ratio of the acid neutralizer or scavenger and hydrolytic drying agent can be one-to-one and, in one embodiment, for example and without limitation, range from 1:1 to 1:25, 1:2 to 1:20, 1:3 to 1:10, and values in between. In some embodiments, the amount of acid neutralizer or scavenger is present in a higher amount than the hydrolytic drying agent, while in other embodiments, the hydrolytic drying agent is present in a higher amount. In a particular embodiment, the molar ratio KOH:TEOF is 1 to 6.

In another embodiment in accordance with the specification, the composition for neutralizing or removal of an acid in refrigeration or air-conditioning system further comprises a miscible antioxidant. Nonlimiting examples of the antioxidants that can be used include phenolic antioxidants such as, phenol, 2,6-di-t-butyl-4-methylphenol and 4,4'-methylenebis(2,6-di-t-butylphenol), and bisphenol A, amine and thiazine antioxidants such as p,p-dioctylphenylamine, monooctyldiphenylamine, phenothiazine, 3,7-dioctylphenothiazine, N,N-di(2-naphthyl)-p-phenylenediamine, phenyl-1-naphthylamine, phenyl-2-naphthylamine, alkylphenyl-1-naphthylamines, and alkylphenyl-2-naphthylamines; sulfur-containing antioxidants such as alkyl disulfide, thiodipropionic acid esters and benzothiazole; and zinc compounds such as zinc dialkyl dithiophosphates and zinc diaryl dithiophosphates. The lubricant composition may comprise up to about 5.0 weight % antioxidants, about 0.01 to about 5 weight %, about 0.1 to about 2.0 weight %, or about 0.2 to about 0.8 weight % antioxidants, or any combination of the values noted herein. The composition for neutralizing or removal of an acid in refrigeration or air-conditioning system may include one or a combination of two or more antioxidant compounds.

In a further embodiment in accordance with the specification, the composition for neutralizing or removal of an acid in refrigeration or air-conditioning system further comprises one or more additional additives, such as an anti-corrosion additive or metal deactivator. Non-limiting examples of anti-corrosion additive and metal deactivator include diaryl sulfides, arylalkyl sulfides, dialkyl sulfides, diaryl disulfides, arylalkyl disulfides, dialkyl disulfides, diaryl polysulfides, arylalkyl polysulfides, and dialkyl polysulfides, such as dibenzyl disulfide and dioctyl sulfide, dithiocarbamates such as methylene-bis-dibutyldithiocarbamate, alkyl and aryl derivatives of 1,2,4 triazole and those of benzotriazole and tolutriazole, derivatives of 2-mercaptobenzothiazole such as 1-[N,N-bis(2-ethylhexyl)aminomethyl]-2-mercapto-1H-1,3-benzothiazole, derivatives of 2,5-dimercapto-1,3,4-thiadiazole such as 2,5-bis(tert-nonyldithio)-1,3,4-thiadiazole and 2,5-bis(n-octyldithio)-1,3,4-thiadiazole, which may be used alone or in any combination. Chelating agents such as N,N'-disalicylidene-1,2-diaminopropane may be included. Additional examples include succinic acid derivatives and phosphoric acid esters, containing 5 to 20 carbon atoms. Non-limiting examples of alkenyl succinic acid derivatives include partial esters with alcohols, diols or, partial amides of alkyl- and alkenyl-succinic acids. Specific, nonlimiting examples of phosphoric acid esters include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate and xylenyldiphenyl phosphate. These additives may be used individually or in any combination, in any desired amount. In various embodiments, the composition for neutralizing or removal of an acid in refrigeration or air-conditioning system may include about 0.01 weight % to about 5.0 weight %, about 0.01 weight % to about 4.0 weight %, about 0.02 weight % to about 3.0 weight %, or 0.1 weight % to about 0.5 weight % each of the additives, or any values in between or combination of values noted herein. These additives may be used alone or in any combination with each other or with other additives such as antioxidants, oiliness agents, anti-foaming agents, viscosity index improvers, pour point depressants, detergent dispersants, stabilizers, and flammability suppressants.

In another further embodiment in accordance with the specification, the composition for neutralizing or removal of an acid in refrigeration or air-conditioning system further comprises a dye. The dye used is not particularly limited and can include fluorescent dyes, phosphorescent dyes and/or colored dyes. In one embodiment, for example and without limitation, the dye used is perylene or naphthalimide, or its derivatives. Such dyes can be used for leak detection purposes, where the dye can flow through any leak in the system for use in known external leak detection methods, for example involving ultraviolet lights.

The composition as disclosed herein can be used for neutralizing or removal of an acid in refrigeration or air-conditioning system. The composition can be used as an additive in a lubricating oil used in the refrigeration or air-conditioning system. The composition can be added to a refrigeration or air-conditioning system for neutralizing or removing an acid from the system and to prevent corrosion.

In a particular embodiment, the composition as disclosed herein can be used for neutralizing or removal of an acid in a refrigeration or air-conditioning system during compressor replacement. When a compressor burnout occurs, the compressor is removed and a nitrogen flush is carried out through the pipe-lines or line-set to clear the lines of any particulates or acidic oil residue. A solvent flush is then performed to remove any residuals that can cause damage to the new compressor, followed by re-connection of the new compressor to the system. The use of a solvent flush can lead to small quantities of the solvent, which can contain acidic oil, to remain in the system with the new compressor, and which can have a detrimental impact. To address the detrimental impact that can be caused by the solvent, upon nitrogen flush of the auxiliaries, such as the line-set, evaporator and condenser, the new compressor is connected and the line-set is brazed to the condenser. Subsequently, the composition, as disclosed herein, is added to the system to neutralize any residual acidic oil. This allows removal of any remaining acidic oil from the system.

The composition can be supplied in a canister as a separate product or as part of a kit. The canister containing the composition can be present under reduced pressure, such as a vacuum-packed can, where upon connection of the canister with the air-conditioning or refrigeration system, allows the contents of the canister to be added to the air-conditioning or refrigeration system. Alternatively, the canister containing the composition can be a pressurized can with propellant. The propellant used is not particularly limited, and can include, for example and without limitation, nitrogen, carbon dioxide or other gaseous propellant. In another embodiment, the composition can be injected into the system using a syringe or syringe-type system. In a further embodiment, for example and without limitation, the composition can be provided to the system using a flexible-expanding tube, where the tube is sealed at one end and the other end consists of a two-way flow fitting that can be attached to the refrigeration or air-conditioning system.

EXAMPLES

Some test results which demonstrate the beneficial effect of the combination of triethylorthoformate (TEOF) in combination with potassium hydroxide (KOH) as a neutralizing agent are shown in Table 1.

The test procedure consisted of running a laboratory modified apparatus consisting of:
1) a fractional horse power compressor outfitted with oil sump drain piping and valve for oil sampling and oil recharging
2) condenser—air derivative style
3) evaporator—air derivative style
4) liquid line drier—solid core and desiccant bead
5) liquid line sight glass
6) charging and sampling ports distributed throughout refrigerant circuit
7) high and low pressure mounted gauge's
8) isolation valves implemented at critical points/components to assist in sectional or specific component replacement and servicing without complete removal of refrigerant or oil.

Full access was supplied to both exchangers to modify air flow affecting heat exchange so as to increase or decrease load as desired during the experiment, simulating conditions found in the field.

Test conditions were essentially constant with:
Refrigerant: 21.5 oz R-22
Oil Charge: 170-180 g POE
Oil grade-ISO 32
Ambient air-20.5 C
Relative Humidity: 50%

The oil charge consisted of commercial POE refrigeration compressor oil to which oleic acid was added to give the desired initial TAN number.

An alcoholic solution of 0.1N KOH alone or in combination with TEOF was injected after a run-in period to stabilize operation. Quantities of KOH were chosen to provide correspond to exact neutralization of the acid quantity as measured by the initial TAN as determined. After a set period of time, the unit was shut down and the oil recovered. The TAN of the recovered oil was determined by titration with KOH by standard procedures.

TABLE 1

IMPROVEMENT IN ACID CONTENT REDUCTION BY TEOF IN KOH

| TEST NO. | RUN TIME (hr) | KOH CHARGE (mL) | TEOF CHARGE (mL) | TAN START | TAN END | % TAN CHANGE |
|---|---|---|---|---|---|---|
| 1 | 3 | 5.63 | 0 | 0.183 | 0.145 | 21 |
| 2 | 3 | 5.63 | 0 | 0.183 | 0.107 | 42 |
| 3 | 3 | 5.63 | 0.5 | 0.183 | 0.110 | 40 |
| 4 | 3 | 5.63 | 0.5 | 0.183 | 0.118 | 36 |
| 5 | 3 | 6 | 0 | 0.196 | 0.134 | 32 |
| 6 | 3 | 6 | 0.5 | 0.196 | 0.113 | 42 |
| 7 | 3 | 7.53 | 0 | 0.243 | 0.154 | 37 |
| 8 | 3 | 7.53 | 0.5 | 0.243 | 0.096 | 60 |
| 9 | 6 | 5.63 | 0.5 | 0.183 | 0.023 | 87 |

Example 1

Test Nos. 1-4 show results for charges of 5.63 mL KOH solution with or without the inclusion of 0.5 mL TEOF. With KOH solution alone a reduction of about 32+−10% was achieved after 3 hrs; a perhaps marginal improvement to 38+−2% occurred when TEOF was added.

Tests 5 and 6 confirmed this small advantage in a different pair of back-to-back experiments with the inclusion of TEOF using 6 mL of KOH solution giving an improvement of 42 vs. 32% reduction in acid formation.

Example 2

Test Nos. 7 and 8 show the improved effect of TEOF at a slightly higher concentration of KOH. At 7.53 mL of KOH, the hydroxide alone gave an acid reduction of 37% but this was improved dramatically to 60% upon inclusion of the TEOF.

Example 3

Test No. 9 shows the effect of time on the reduction of acid content of the refrigeration oil when TEOF is added with KOH. The acid reduction is essentially complete at 87%. The 0.023 final TAN is actually that for the fresh refrigeration oil before oleic acid addition.

Certain adaptations and modifications of the described embodiments can be made. Therefore, the above discussed embodiments are considered to be illustrative and not restrictive.

What is claimed is:

1. A composition for neutralizing or removal of an acid in refrigeration or air-conditioning system, the composition comprising an acid neutralizer or scavenger and a hydrolytic drying agent in a mole ratio from about 1:1 to about 1:10; wherein the acid neutralizer or scavenger is a metal alkoxide, glycidyl ether, epoxide, alkanolamine, arylamine, overbased metal sulphonates or an inorganic base; and further wherein the hydrolytic drying agent is an orthoester, acetal, epoxide, or carbodiimide; and still further wherein the acid neutralizer or scavenger and the hydrolytic drying agent are not both epoxide at the same time.

2. The composition of claim 1, wherein the inorganic base is NaOH, KOH, or LiOH.

3. The composition of claim 1, wherein the hydrolytic drying agent is an orthoester.

4. The composition of claim 3, wherein the hydrolytic drying agent is triethylorthoformate.

5. The composition of claim 1, further comprising a miscible antioxidant.

6. The composition of claim 5, wherein the antioxidant is a phenol or phenyl-alpha-naphthylamine.

7. The composition of claim 1, further comprising a miscible anti-corrosion additive.

8. The composition of claim 7, wherein the anti-corrosion additive is an alkenyl succinic acid derivative.

9. The composition of claim 1, further comprising an anti-wear additive.

10. The composition of claim 1, further comprising a metal deactivator additive.

11. The composition according to claim 1, further comprising a refrigerant compressor oil.

12. The composition according to claim 1, further comprising a dye.

13. A method of neutralizing or removal of an acid in a refrigeration or air-conditioning system, the method comprising adding in the refrigeration or air-conditioning system the composition as defined in claim 1.

14. A can comprising the composition as defined in claim 1 for neutralizing or removal of an acid in refrigeration or air-conditioning system.

15. A kit, comprising:
the can as defined in claim 14; and
instructions for use.

16. A method of neutralizing or removal of an acid in a refrigeration or air-conditioning system, the method comprising:

removing a compressor from the system;
flushing the system for removal of particulates;
connecting a new compressor to the system; and
adding in the refrigeration or air-conditioning system the composition as defined in claim 1.

17. The method of claim 16, wherein the flushing the system comprises blowing nitrogen through auxiliaries connected to the system.

18. The method of claim 17, wherein the auxiliaries comprise the line-set, evaporator or condenser.

19. A composition for neutralizing or removal of an acid in refrigeration or air-conditioning system, the composition comprising an acid neutralizer or scavenger and a hydrolytic drying agent in a mole ratio from about 1:1 to about 1:10; wherein the acid neutralizer or scavenger is a metal alkoxide, carbodiimide, glycidyl ether, epoxide, alkanolamine, arylamine, overbased metal sulphonates or an inorganic base; and further wherein the hydrolytic drying agent is an orthoester, acetal, or epoxide; and still further wherein the acid neutralizer or scavenger and the hydrolytic drying agent are not both epoxide at the same time.

* * * * *